Aug. 7, 1951  C. A. KIRKMAN ET AL  2,563,531
ROTARY HOUSE BASE

Filed Nov. 26, 1946  6 Sheets-Sheet 1

INVENTOR,
WESSON A. KIRKMAN,
RUSSELL D. KIRKMAN,
CHESTER A. KIRKMAN:
BY
Calvin Brown,
Attorney.

Aug. 7, 1951     C. A. KIRKMAN ET AL     2,563,531
ROTARY HOUSE BASE
Filed Nov. 26, 1946     6 Sheets-Sheet 2
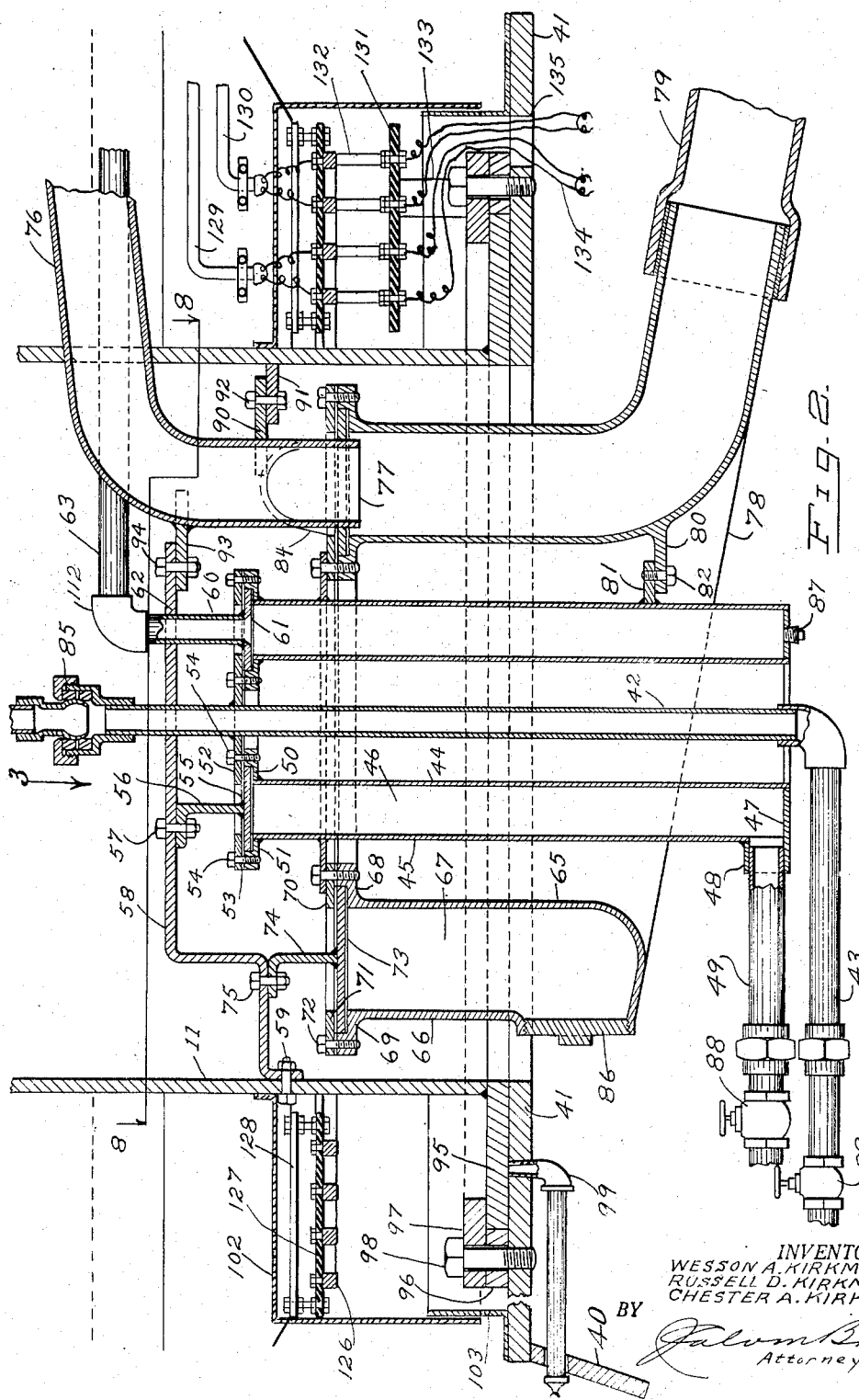
INVENTORS,
WESSON A. KIRKMAN,
RUSSELL D. KIRKMAN,
CHESTER A. KIRKMAN;
BY
*Galvin Brown*
Attorney

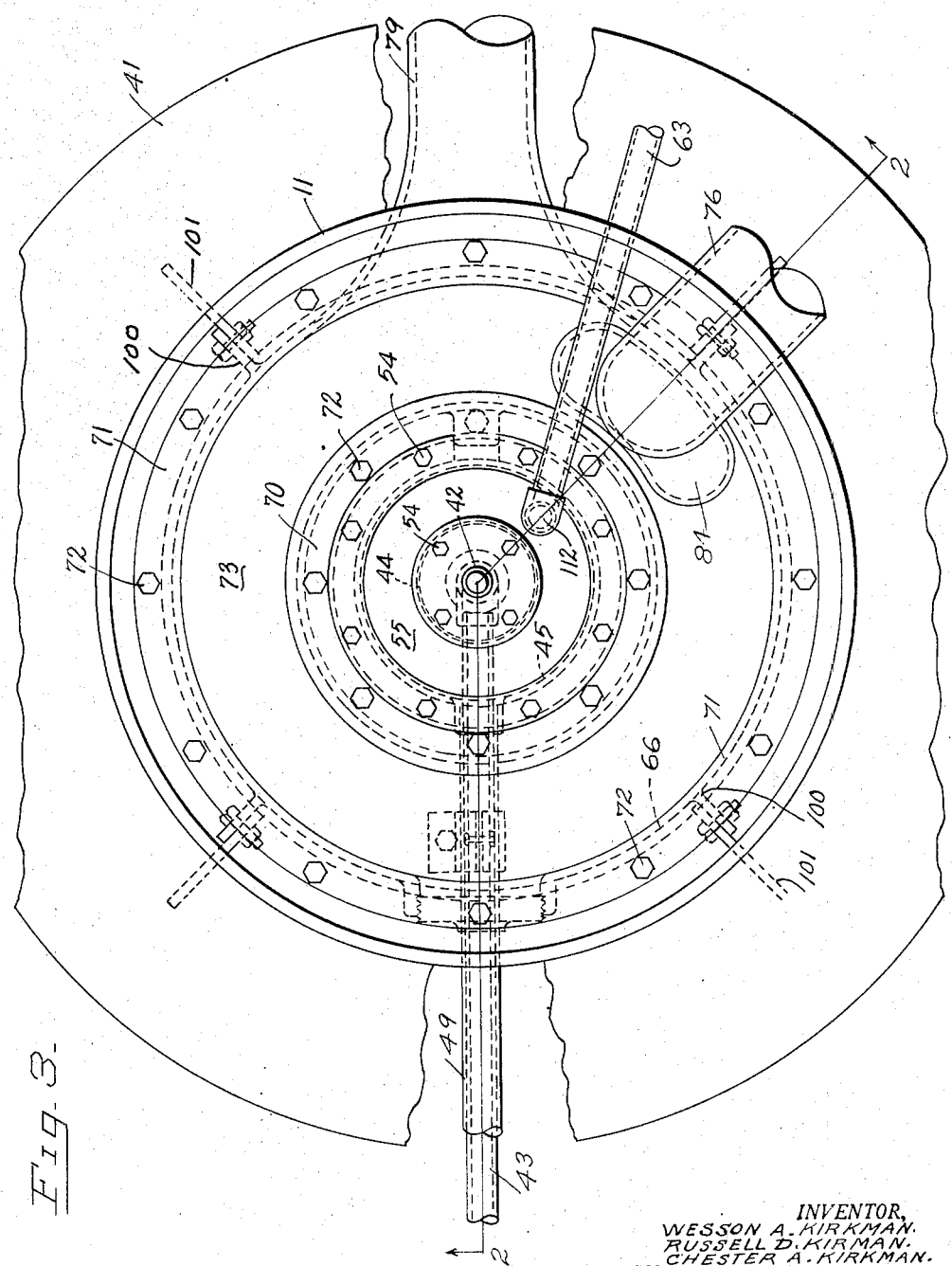

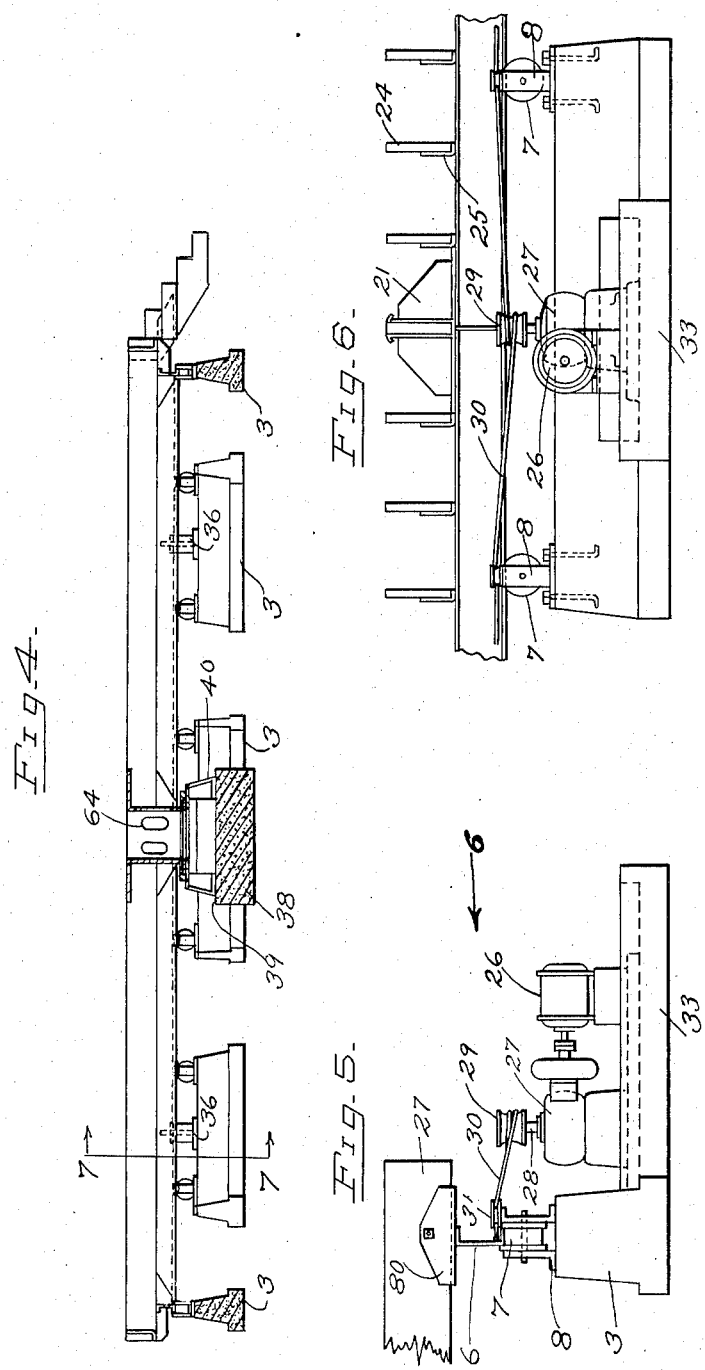

Aug. 7, 1951     C. A. KIRKMAN ET AL     2,563,531
ROTARY HOUSE BASE

Filed Nov. 26, 1946

INVENTORS
WESSON A. KIRKMAN,
RUSSELL D. KIRKMAN,
CHESTER A. KIRKMAN:
BY
        Attorney.

Aug. 7, 1951
C. A. KIRKMAN ET AL
2,563,531
ROTARY HOUSE BASE
Filed Nov. 26, 1946
6 Sheets-Sheet 6
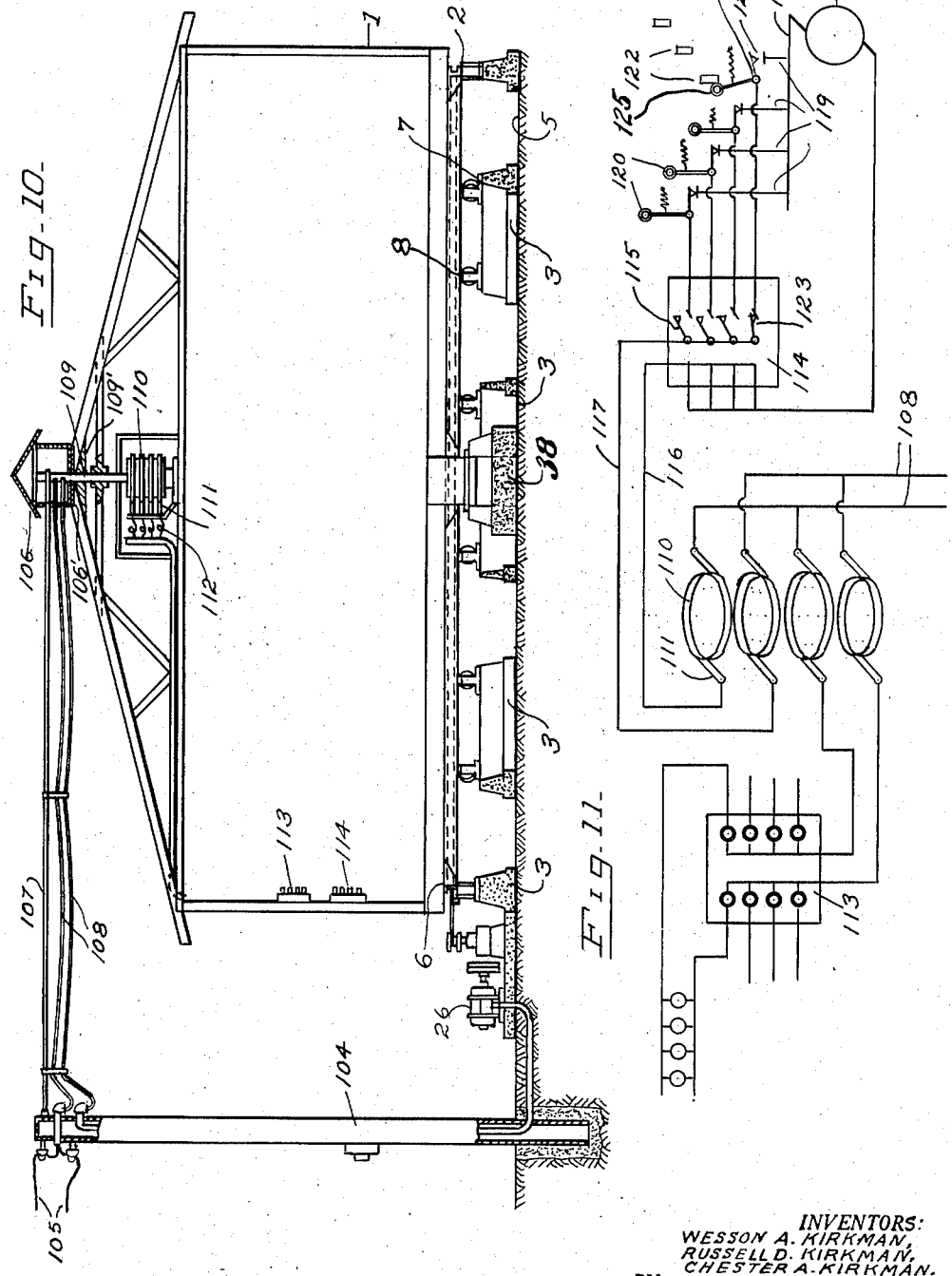
INVENTORS:
WESSON A. KIRKMAN,
RUSSELL D. KIRKMAN,
CHESTER A. KIRKMAN.
BY
Attorney.

Patented Aug. 7, 1951

2,563,531

UNITED STATES PATENT OFFICE 2,563,531

ROTARY HOUSE BASE

Chester A. Kirkman, Russell D. Kirkman, and Wesson A. Kirkman, Los Angeles, Calif.

Application November 26, 1946, Serial No. 712,358

2 Claims. (Cl. 20—1)

The present invention relates to turntables, and specifically to what is known as a rotary house base.

The invention has for an object the provision of a rotary house base so constructed and arranged as to permit utilities to enter the house. By utilities we refer to the water and gas mains, and sewage disposal and electrical conduits, which enter the house in such a manner as to comply with underwriters' requirements, and wherein there is no contamination between the various utility inlets and outlets.

A further object is the provision of a rotary house base arranged to permit controlled rotation of a house as desired by the house occupants.

Specifically, we contemplate a house wherein, under control, the house will rotate in a given direction, and through selected degrees, as for instance, ninety degrees of arc. In this manner any given location of the house may be rotated so that a given room at all times receives sunshine during a day, or the said room is maintained in the shade.

A further object is the provision of a rotary house base so constructed and arranged as to be of rigid structure, wherein stresses have been analyzed, a structure which permits the erection of an attractive type of dwelling or building, wherein the various utility inlets are readily accessible, which is economical of construction, and superior to structures utilizing a fixed foundation.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

In the drawing:

Figure 2 is a fragmentary, sectional view on the line 2—2 of Figure 3, and looking in the direction of the arrows;

Figure 3 is a fragmentary plan view, and on an enlarged scale of the gland assembly for utilities entering the building structure, said view looking generally in the direction of the arrow 3 of Figure 2;

Figure 4 is a sectional view on the line 4—4 of Figure 1, and looking in the direction of the arrows;

Figure 5 is a fragmentary elevation of means for rotating the turntable, and looking substantially in the direction of the arrow 5 of Figure 1;

Figure 6 is a fragmentary elevation of the means shown in Figure 5, and looking in the direction of the arrow 6 of Figure 5;

Figure 10 is a sectional view showing a house mounted on the turntable with means for connecting electricity within the house through an overhead conduit; and Figure 11 is a diagrammatic wiring diagram which may be utilized in the practice of the invention.

Referring now with particularity to the drawings, and specifically to Figure 10, I have shown a framing I representative of a dwelling of some form whether it be house, store, or other structure, and said framing is mounted so as to be rotated progressive amounts at the will of an operator. This invention differs in many particulars from ordinary turntables such as are used in railway yards, in garages for automobiles, and the like, in that the present structure is adapted not only to rotate the house but to permit utilities to enter the house. In this respect the invention incorporates what is thought to be by the said inventors numerous refinements which render the invention attractive to a user thereof, and which is capable of being utilized in practically any form of dwelling to obtain results superior to dwellings which have a fixed foundation, and therefore non-rotatable.

Figure 1:
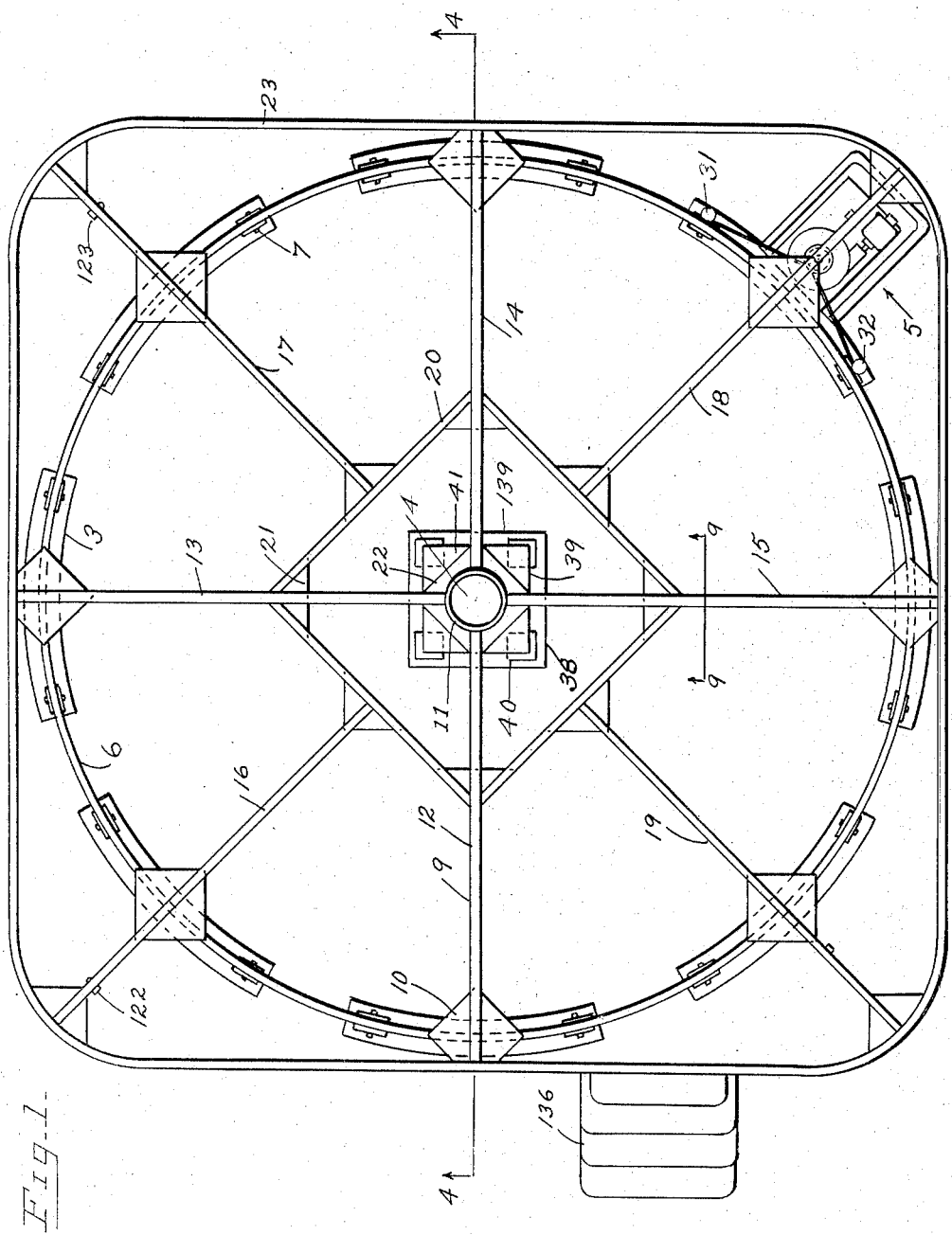
Figure 1 is a plan view of the revolving base for a dwelling or other structure.

The improved turntable structure is designated as an entirety and in one embodiment by the numeral 2 and the same includes sector-type piers 3 arranged in spaced, circular relationship. This circular relationship is best shown in Figure 1 wherein will be seen that said sectors lie in the same circumference or are all equally spaced radially relative to a center point 4. The piers may be of the form shown in Figure 10, or any other form in cross-section. The said piers may be of concrete or other material, and are adapted for placement upon a foundation such as the earth surface indicated at 5. The top surface of each pier lies in the same horizontal plane. Assuming that all the piers are in position, said piers are adapted to support a circular rail or track 6 through the medium of grooved wheels 7. The wheels 7 are supported by means of brackets 8 on the tops of the piers 3. The rail in the present instance is channel-like in section, as see Figure 5, and one leg of the channel is received between the flanges of a wheel 7. This construction permits a ready guiding of the turntable during rotation thereof. The rail 6 in turn is secured to stringers designated generally as 9, see Figure 1. The stringer size will depend upon the dimension, specifically the floor dimension, of the structure to be supported by the turntable, and said stringers are of a length sufficient to overlap the rail, which is to say, passed beyond the circumference thereof. The stringers 9 are secured to said rails by means of gusset plates designated generally as 10. Certain of the stringers 9 are provided with sheathing 11a, see Figure 9; this sheathing constitutes metallic plates secured on opposite sides of a stringer for the purpose of bracing the stringer and likewise providing means whereby the gusset plates may be secured to said sheathing by welding, bolting or otherwise. Four of the stringers 9 extend radially outwardly from a hub 11. Stringers 9, indicated at 12, 13, 14 and 15, are termed radial stringers, while other stringers 9 shown at 16, 17, 18 and 19 form extensions from the stringers shown at 20 and which stringers are interconnected with the radial stringers 12, 13, 14 and 15. All stringers connected with stringers shown at 20 are secured by means of gusset plates designated generally at 21, to assure proper bracing. The stringers shown at 12 to 15, inclusive, are braced adjacent the hub 11 by means of gusset plates designated generally by numeral 22.

A bounding bar 23 is carried by ends of the radial stringers 9. This bounding bar defines the limits of the dwelling 1 mounted upon the turntable, and indicates in the present instance that the dwelling may take a square form; the corner portions are rounded.

Figure 9:
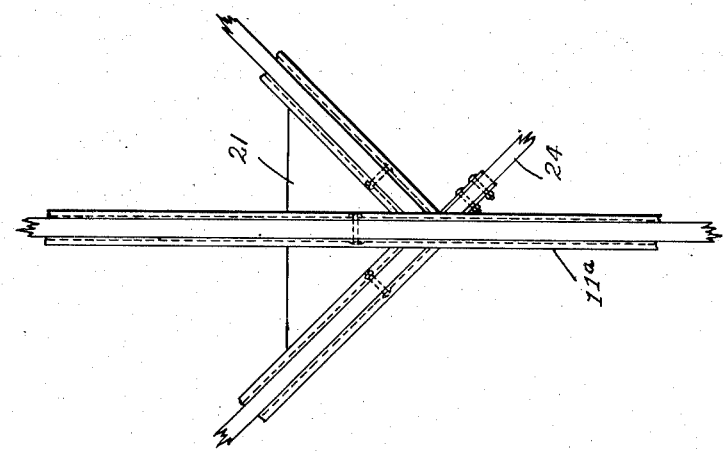
Figure 9 is an enlarged fragmentary view taken on the line 9—9 of Figure 1.
Figure 8:
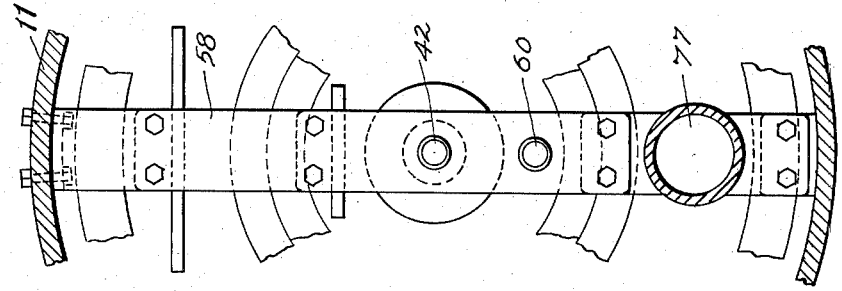
Figure 8 is a sectional view on the line 8—8 of Figure 2, the parts being shown in fragment.

It is intended that floor joists 24, see Figure 9, should be carried on and between the stringers 9 so as to form a means whereby a flooring may be secured to the turntable, the said floor joists 24 extend from the bounding bar 23 and between the stringers so that a flooring may overlie the same. This flooring is not shown, but it is intended that it should follow ordinary construction.

Figure 6 shows floor joists 24 mounted upon the stringers, and said floor joists may be secured to said stringers and particularly the metal sheathing surrounding certain of the stringers as depicted in Figure 9, through the medium of brackets designated generally as 25. Said brackets may be angle-iron in form and secured to the sheathing of the joists by welding, bolting or otherwise. The general intention is that the stringers and floor joists should be of firm construction, so that weaving does not occur when the turntable is rotated on the rail 6. In the drawings, one possible means of securing the joists and stringers is illustrated, as those skilled in the art may devise other means. The dwelling house framing, or other structure, is of course secured to the joists and stringers in the ordinary manner.

In order to rotate the house we provide a motor 26, see Figures 5 and 6, which drives a reduction unit 27 through a fluid drive, the reduction unit including a shaft 28, carrying a pulley 29. A continuous cable 30 is passed around the rail 6, and looped about the pulley 29. As shown, the cable is confined within the channel of the rail. The cable may be guided by pulleys or rollers 31 and 32 carried by one of the piers 3, see Figure 1. The motor 26 and reduction unit 27 are mounted upon a suitable foundation 33 and in such a manner as to allow adjustment thereof to tension the cable 30. This adjustment while not detailed is indicated by the dotted lines in Figures 5 and 6.

Figure 7:
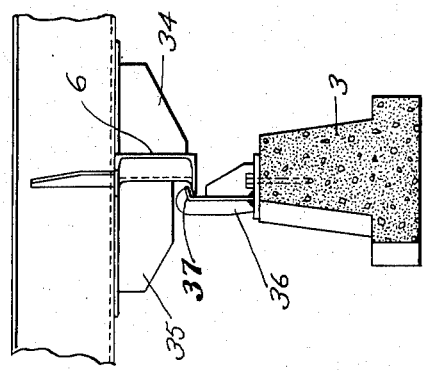
Figure 7 is a fragmentary sectional view of stabilizing means for the turntable, said view taken substantially on the line 7—7 of Figure 4.

In addition to the horizontal gussets shown in Figure 1 for the purpose of bracing the stringers, we have provided vertical gussets for the rail 6 as shown in Figure 7 at 34 and 35. These gussets extend between the rail and one of the stringers. As it may become necessary to brace the turntable against windage, the said piers 3 carry brackets 36 which have a portion 37 overlying one leg of the channel-type rail 6. This construction assures that regardless of side thrusts due to winds or other elements, that the rail will at all times remain on the rollers 7, which rollers support the rail.

As previously indicated, the hub 11 acts to support the inner ends of the stringers 9. The center for the turntable is so constructed and arranged as not only to support the turntable at this point, but likewise to permit utilities to be received within the dwelling or other structure 1. Thus in the structure shown, a central pier 38 is provided. As shown in Figures 4 and 10 the center pier 38 may be of solid construction and carry upon its top surface 39 spaced supports 40 for a base plate 41, the said base plate underlying the hub 11 as more clearly detailed in Figure 2.

The central hub is detailed in Figures 2 and 3, and reference is now made to these figures. The construction is such that the hub casing 11 rotates when the turntable is rotated. As shown in the figures, the internal diameter of the hub casing is sufficient to accommodate certain utility pipes. On the axis of the hub casing 11 is a vertical pipe 42. This pipe is adapted to convey gas within the dwelling or other structure supported on the turntable, the said pipe at its lowermost end being connected through a fitting with the gas main shown at 43. Concentric to pipe 42 and spaced therefrom are two spaced-apart annular tubes 44 and 45 which provide an annular passageway 46. One end of the two tubes 44 and 45 is closed by an annular wall 47, and a fitting at 48 permits communication with the annular space 46 and with a pipe 49 leading to the water main. The top of tubes 44 and 45 carry inner and outer annular flanges 50 and 51. These flanges are either integrally formed on the upper ends of said tubes 44 and 45 or welded thereto as shown in Figure 2.

Overlying the flanges 50 and 51 are annular plates 52 and 53, the said plates being spaced apart and lying in the same plane and secured to the flanges 50 and 51 by any suitable means such as bolts designated generally at 54. Plate 52 surrounds the pipe 42 and may be secured thereto by welding. Interposed between plates 52 and 53 and the flanges 50 and 51 is an annular gland 55. To stabilize the gland so that it may rotate between the seat members, being the members 50 to 53, inclusive, a bracket 56 is secured to said gasket by welding or otherwise, the said bracket in turn, through the medium of a bolt or other means 57, being carried by a stabilizer bar 58. This stabilizer bar is secured at one end by bolt 59 to hub casing 11.

A pipe 60 communicates with an opening 61 in the gland 55, which opening in turn is in communication with the annular passageway 46. This pipe is passed through an opening in the bar 58 at 62 and through the medium of a fitting communicates with a pipe 63 leading to water outlets and other fixtures within the house which is supported by the turntable. Upon reference to Figure 4 it will be observed that the casing hub 11 is provided with a series of transverse openings such as shown at 64 and it is through certain of the openings 64 that the pipe such as shown at 63 is passed. See also Figure 3.

Spacedly surrounding the annular tubes or piping 44 and 45 are two spaced apart annular pipes or tubes 65 and 66 which may be a casting, to provide an annular passageway 67 therebetween. These pipes or castings take care of the sewage. The upper ends of said tubes or pipes are provided with annular recessed annular flanges 68 and 69 having annular plates 70 and 71 secured thereto by bolts or other means, designated generally by 72, with an annular gland plate 73 interposed between the flanges 68 and 69, and the annular plates 70 and 71.

A bracket 74 is welded or otherwise secured to the gland plate 73 and in turn said bracket is fastened by bolts 75 to the stabilizer bar 58. A waste pipe 76 is passed through one of the openings 64 of the hub casing 11 and so curved as to have the outlet end 77 thereof passed through an opening in the gland plate 73 whereby sewage may flow therethrough from the house and into the annular space 67. The arrangement is such that the wall height for the tubes or pipes 65 and 66 varies and there is a downward slope at the base, as indicated by the line 78. The annular space 67 is in communication with the usual sewage pipe 79.

To stabilize the structure brackets are mounted on both the central tube or casting 65 at 80, and to the tube 45 at 81, the said brackets being interconnected through the medium of a bolt or screw 82. While single brackets have been mentioned, it is evident that a plurality thereof may be provided, see Figure 3 at 100 and 101.

Attention is directed to the enlargement on the end of the part 76 where it communicates with the annular space 67, see Figure 3 at 94. This construction aids in the efficient disposal of sewage and its reception within the space 67.

Any convenient type of gland may be utilized in conjunction with the upper end of the gas pipe 42 for conducting the gas within the house supported by the turntable, and an accepted type of gland for this purpose is illustrated in Figure 2 at 85. This particular gland is of well known construction.

For each of the utility pipes we may provide drain plugs or inspection plugs, such as indicated at 86, for the sewage disposal pipe, and at 87 for the water pipe. Other refinements may be added as desired, such as by including valves 88 and 89 controlling the passage of water or gas within the space 46 and pipe 42.

The base plate 41 is not adapted for rotation, nor do the sewage disposal pipes 65 and 66, the water pipes 44 and 45, or gas pipe 42, rotate when the hub casing is rotated. It will be observed that the stabilizer bar 58, which rotates with the hub casing 11, is secured by means of brackets 56 and 74 to the gland plates 55 and 73; with the consequence that when the hub casing rotates the gland plates 55 and 73 will rotate upon their seats. The pipe 76 will rotate with the hub casing 11 for the reason that said pipe passes through said hub casing and is attached to said hub casing by means of cooperating brackets 90 and 91, held together by a bolt 92, and likewise by a bracket 93 which cooperates with one end of the stabilizer bar 58 and secured to said stabilizer bar by means of a bolt 94.

What may be termed a bearing or pivot plate 95 rests on the top surface of the base plate 41. This pivot plate is annular in form and held against shifting during rotation thereof by means of two rings 96 and 97, the ring 96 lying adjacent the periphery of the plate 95, while the ring 97 rests upon ring 96 and overlaps the pivot plate 95. Any convenient means such as bolts shown at 98 may be utilized for holding the parts in working relationship.

A ground fit engagement may exist between the cooperating faces of the base plate and the pivot plate, or roller bearings may be provided as deemed necessary. To lubricate the working surfaces we may provide some convenient means whereby grease may be forced between the said surfaces, as for instance, shown at 99, and consisting of a pipe leading to said surfaces and exteriorly of a base plate support.

It is not intended that the various utility pipes should of necessity depend for support upon masonry for the reason that all of said utility pipes should be interconnected so that relative shifting therebetween is prevented. This is accomplished in one embodiment of the invention by providing radial brackets or lugs 100, see Figure 3, secured to the external pipe 66 and anchored to mounting brackets 101 integrally formed on or otherwise secured to base plate 41.

The hub casing 11 is provided with an external skirting 102, which skirting cooperates with an external skirting 103 secured to the base plate 41, see Figure 2. This skirting is adapted to confine electrical means such as switches which control the lighting circuit and wiring to the motor 26 for the house and turntable. The skirting acts to protect this wiring against the elements.

We have shown two possible electrical circuits which may be utilized, one in Figure 2 and the other in Figure 10. In Figure 10 we provide a pole 104 adjacent the turntable. Power lines 105 extend to the pole. In Figure 10 a cupola 106 is supported on a bearing plate 106' carried by the roof rafters, the rafters being braced at this zone by members 109'. Extending between the pole and the cupola is an overhead supporting arm 107. This arm supports wires 108 between the pole and the interior of the cupola. Extending downwardly from the cupola and within what may be termed the attic of the house is a shaft 109. This shaft is properly braced by a bearing. Carried by the rafters in the attic is an end bearing for one end of the shaft, and on said shaft are a series of disc armatures 110. There are brushes such as illustrated at 111 in contact with the discs 110 having leads 112 extending therefrom. Within the house for access by the occupant are a series of switches 113 and 114. Attention is directed to the diagrammatic wiring in Figure 11. At 115 are a series of four trip switches, the switch arms of which are interconnected. Wires 116 and 117 connect with the brushes 111 and one of the wires, to wit, 117, with the switch arms 115. The other wire leads to the motor 26 and from the motor wire 118 connects with contact points 119 of four switches 120. Each switch arm 120 is pivoted at 121 90° apart to a fixed foundation beneath the turntable and secured to the turntable are stops 122 of which there are four. To illustrate the operation, when one of the switches 114 is closed, a trip switch 115 is closed, for instance, the switch shown at 123. A switch 120, shown at 124, will complete the circuit to motor 26 until such time as the switch arm wheel 125 strikes one of the stops 122 to open the switch, whereupon the motor will stop operation and the turntable will stop its rotation, the switch 120 again closing under spring actuation.

Each one of the other switch arms has a separate contact which is brought into position when the turntable has made a certain degree of rotation, it being observed in Figure 1 that said contacts 122 and 123 lie in different circles of rotation.

External the hub casing 11 and protected by the skirting 102 is an annular series of armatures 126, of which there are four. Each armature takes the form of a ring rigidly secured to and depending from an annular insulation disc 127, said disc being supported by means 128 fastened to the skirting 102. The means 128 may constitute either an annulus or a series of transverse supports for sides of the insulation disc. Electrical conduits 129 and 130 each have two wires which are independently secured to the armatures 126 as shown in Figure 2. Positioned beneath the armatures 126 is an insulation disc 131 carrying a series of spaced brushes 132 adapted to contact the armatures 126. The insulation disc is supported by a bracket 133, said bracket being mounted upon ring 97. There are electrical leads 134 connected to the brushes 132, the said leads being passed through an opening 135 in the base plate 41. It is obvious that the armatures 126 will rotate as the hub is turned and that the brushes will remain stationary as the turntable rotates in the same manner as for the armatures 110 and its brushes 111, the remaining circuit members being the same as shown in Figure 11. The electrical means of Figure 2 does away with the overhead system shown in Figure 10 and in some installations may be desirable. The wires in the conduits 129 and 130, Fig. 2, lead to the switches 113 and 114, Fig. 10, one set of switches controlling the lighting circuit and the other set controlling motor operation.

The operation, uses and advantages of the invention just described are as follows:

Having selected the type of structure to be supported by the turntable, and assuming that it is a frame structure, either square in outline or circular, the said structure will be supported by the turntable in the manner shown in Figure 10. A stairway 136, Fig. 1, may be carried by the turntable and external the bounding bar 23 to permit access within the house. If we assume the overhead electrical conduit system as shown in Figure 10, the operation of switches within the house will cause the house to rotate 90° each time a selected switch is closed. The house can therefore be rotated through 360° in one direction, and while no particular means is shown for causing counter-rotation of the house, it is within the purview of the invention to have such an arrangement.

In any event, each time the house rotates through 90° upon the closing of a switch, a switch is automatically opened to break current flow to the motor and stop rotation. All utilities are connected at the zone of the hub and such connection with the utility pipes is effected in the ordinary manner. It is evident that drinking water and the like is not contaminated in the least for the reason that it is separated from the sewage and gas system and there is no communication therebetween. The sewage disposal system is of a size sufficient to handle the sewage effectively and as for the gas, the pipe size is standard.

The utility pipes at the zone of the hub are easily contacted as the turntable will be at a certain height above ground level. The area surrounding the piers 3 may be filled in and a portion within the confines of said piers may constitute a cellar for the house.

We claim:

1. In rotary construction, a platform adapted to support a building structure, said platform provided with a central, annular hub casing, means mounting said platform for rotation about said hub, stationary annular utility pipes concentrically arranged within the confines of said hub, annular gland fittings secured on each annular utility pipe, annular glands slidably fitted in each annular gland fitting, means of communication with utility outlets in the building and each of said annular glands, and means interconnecting the annular glands with the hub to produce rotation of said glands within said fittings when the hub is rotated.

2. In rotary house construction, a platform, a central, annular hub casing secured to the platform and depending therebeneath, separate means mounting said platform for rotation about the hub and adjacent the rim of the platform, a gas intake pipe positioned on the axis of said hub, an annular water pipe concentric with the gas pipe and an annular casting for waste concentric with the water pipe, said waste pipe and said water pipe each provided with annular gland seats, annular glands carried on said seats, and means fixedly interconnecting said annular glands with said hub whereby rotation of the platform produces simultaneous rotation of the hub and said annular glands.

CHESTER A. KIRKMAN.
RUSSELL D. KIRKMAN.
WESSON A. KIRKMAN.

REFERENCES CITED

The following references are of record in the file of this patent:

UNITED STATES PATENTS

| Number | Name | Date |
| --- | --- | --- |
| 439,376 | Blanchard | Oct. 28, 1890 |
| 1,353,798 | Stevens | Sept. 21, 1920 |
| 1,428,139 | Brown | Sept. 5, 1922 |
| 2,294,214 | Seinfeld | Aug. 25, 1942 |

FOREIGN PATENTS

| Number | Country | Date |
| --- | --- | --- |
| 26,890 | Great Britain | 1909 |
| 167,321 | Germany | 1906 |